United States Patent
Laux

(10) Patent No.: US 11,529,841 B2
(45) Date of Patent: Dec. 20, 2022

(54) HVAC SYSTEM FOR A MOTOR VEHICLE

(71) Applicant: MAHLE International GmbH, Stuttgart (DE)

(72) Inventor: Holger Laux, Dietingen (DE)

(73) Assignee: MAHLE International GmbH, Stuttgart (DE)

( * ) Notice: Subject to any disclaimer, the term of this patent is extended or adjusted under 35 U.S.C. 154(b) by 406 days.

(21) Appl. No.: 16/796,560

(22) Filed: Feb. 20, 2020

(65) Prior Publication Data
US 2020/0262267 A1 Aug. 20, 2020

(30) Foreign Application Priority Data
Feb. 20, 2019 (DE) .................. 10 2019 202 301.0

(51) Int. Cl.
*B60H 1/00* (2006.01)
(52) U.S. Cl.
CPC ..... *B60H 1/00057* (2013.01); *B60H 1/00664* (2013.01); *B60H 2001/0015* (2013.01); *B60H 2001/00078* (2013.01); *B60H 2001/00135* (2013.01); *B60H 2001/00721* (2013.01)
(58) Field of Classification Search
CPC ............ B60H 1/00057; B60H 1/00064; B60H 2001/00078; B60H 2001/00135; B60H 2001/0015; B60H 2001/00721
See application file for complete search history.

(56) References Cited

U.S. PATENT DOCUMENTS

| 4,638,977 | A | * | 1/1987 | Vonhausen | F24F 13/1426 74/25 |
| 9,168,828 | B2 | * | 10/2015 | Bourqui | B60K 11/085 |
| 9,290,076 | B2 | | 3/2016 | Mayer | |
| 2014/0000397 | A1 | * | 1/2014 | Nolta, Jr. | F16H 35/02 74/393 |
| 2017/0217282 | A1 | * | 8/2017 | Iyer | B60H 1/00035 |

FOREIGN PATENT DOCUMENTS

| DE | 195 28 714 C1 | 8/1996 |
| DE | 197 57 194 A1 | 6/1999 |
| DE | 10 2011 002 606 A1 | 7/2012 |

* cited by examiner

*Primary Examiner* — Marc E Norman
(74) *Attorney, Agent, or Firm* — Muncy, Geissler, Olds & Lowe, P.C.

(57) ABSTRACT

A HVAC system for a motor vehicle having a housing, wherein the housing has an air inlet for admitting air and a cold air path in which cold air flows is provided in the housing and a warm air path in which warm air flows is provided in the housing, wherein the warm air path and the cold air path open into a mixing chamber, wherein a mixing flap is provided for controlling the proportion of cold air flowing into the mixing chamber and the proportion of warm air flowing into the mixing chamber, wherein the mixing flap is arranged rotatable about an axis and is driven by a flap actuator which has a drive shaft, wherein a gear with a nonlinear translation characteristic is provided between the mixing flap and the drive shaft.

7 Claims, 4 Drawing Sheets

HVAC SYSTEM FOR A MOTOR VEHICLE

This nonprovisional application claims priority under 35 U.S.C. § 119(a) to German Patent Application No. 10 2019 202 301.0, which was filed in Germany on Feb. 20, 2019, and which is herein incorporated by reference.

BACKGROUND OF THE INVENTION

Field of the Invention

The present invention relates to a HVAC system for a motor vehicle.

Background of the Invention

In HVAC systems for a motor vehicle, a cold air path and a warm air path are provided in a housing, wherein cold air by comparison flows through the cold air path and warm air by comparison flows through the warm air path. Air flows into the housing through an air inlet, wherein this air can be fresh air and/or circulating air. This air flows downstream of the air inlet through an evaporator and optionally also through a heating element. The air flowing through the evaporator is cooled and is accordingly cold air. The cold air accordingly flows in the cold air path starting from the evaporator. The air flowing through the heating element is heated and is accordingly warm air. The warm air flows in the warm air path starting from the heating element.

In order to generate an air flow with a defined temperature, which lies between the temperature of the cold air and the temperature of the warm air, a first portion of cold air and a second portion of warm air are introduced into a mixing chamber and mixed there, wherein the mixed air is directed into at least one downstream air duct in order to discharge the temperature-controlled air into the interior of the motor vehicle, for example.

HVAC systems are known in which a mixing flap is provided which controls the mixing ratio of warm air to cold air in the mixing chamber. HVAC systems are also known in which a flap is disposed in the warm air path and a flap in the cold air path in order to control the mixing ratio of warm air and cold air in the mixing chamber. In this regard, such flaps are driven by electric motors which rotate the flaps evenly about an axis of rotation. For an appropriate controllability of the temperature of the mixed air, it is desirable if the air temperature of the mixed air can be controlled as linearly as possible between the temperature of the cold air and the temperature of the warm air. In order to achieve an optimal controllability of the mixing temperature, the increase in the mixing temperature from cold to warm should increase as linearly as possible.

However, the problem arises in this regard that the throttling effect of one mixing flap or the two flaps used in the warm air path and in the cold air path does not change linearly with the rotation of the respective flap. One of the causes is that the air-side flow resistance in the cold air path is considerably lower than in the warm air path, because the air in the warm air path after the evaporator also flows through at least one heating element or heating heat exchanger before it reaches the mixing chamber, whereas the air in the cold air path flows directly into the mixing chamber after the evaporator. As a result, the cold air is the more dominant component during the mixing in the mixing chamber, which leads to a so-called sag in the temperature curve from cold to warm.

An improvement can be achieved by using two flaps, each of which has its own drive motor and can thus be controlled independently of one another. Thus, the linearity of the temperature profile from cold to warm can be improved, but this has the decisive disadvantage that the costs for such a flap assembly increase considerably, which is not desirable.

SUMMARY OF THE INVENTION

It is therefore an object of the present invention to provide a HVAC system for a motor vehicle in which an improved controllability of the mixing temperature occurs with only one mixing flap so that the increase in the mixing temperature from cold to warm increases more linearly than is known in the prior art.

An exemplary embodiment of the invention relates to a HVAC system for a motor vehicle having a housing, wherein the housing has an air inlet for admitting air and a cold air path in which cold air flows is provided in the housing, and a warm air path in which warm air flows is provided in the housing, wherein the warm air path and the cold air path open into a mixing chamber, wherein a mixing flap is provided for controlling the proportion of cold air flowing into the mixing chamber and the proportion of warm air flowing into the mixing chamber, wherein the mixing flap is arranged rotatable about an axis and is driven by a flap actuator which has a drive shaft, wherein a gear with a nonlinear translation characteristic is provided between the mixing flap and the drive shaft. This makes it possible to better adapt the adjustment of the mixing flap in different operating positions to the requirements, so that the control curve for the mixing of cold and warm air starting from cold to warm has a considerably more linear course than is known in the prior art.

It is particularly advantageous if the gear has a gear ratio that is variable via the angle of rotation of the drive shaft of the flap actuator. Thus, it is possible that starting from the 100% cold operating position a steeper characteristic curve results than in the prior art, and it is also optionally possible further that a flattening of the very steep prior-art characteristic curve results toward an operating position of 100% warm, so that overall a more linear characteristic results.

In an exemplary embodiment, it is also advantageous if the gear is a gear train, which has a gear train gear ratio that is variable via the angle of rotation of the drive shaft of the flap actuator. Alternatively, the gear can also be a belt drive or a friction gear, which has a gear ratio that is variable via the angle of rotation. It can be achieved thereby that the desired adjustment characteristic of the mixing flap is available over the life of the mixing flap actuator.

It is also advantageous if the nonlinear gear ratio or gear train gear ratio is selected such that the rotation of the mixing flap from the operating position of 100% cold is faster than from the operating position of 50% cold and 50% warm and from the operating position of 100% warm at the same angle of rotation of the drive shaft. It is achieved thereby that during an adjustment the rotational speed of the mixing flap in an operating position of 100% cold is faster in the direction of warm than from a rather warm operating position, so that the dominance of the cold air in the mixing chamber is reduced by a faster adjustment of the mixing flap.

It is particularly advantageous if the nonlinear gear ratio or gear train gear ratio is selected such that the rotation of the mixing flap from the operating position of 50% cold and 50% warm is faster than from the operating position of 100% warm at the same angle of rotation of the drive shaft.

It is achieved thereby that during an adjustment the rotational speed of the mixing flap in an operating position of 50% cold and 50% warm is faster in the direction of warm than from a 100% warm operating position, so that the dominance of the cold air in the mixing chamber is also reduced even by a faster adjustment of the mixing flap than in the case of a completely warm operating position.

It is particularly advantageous if the nonlinear gear ratio or gear train gear ratio is selected such that the gear ratio in the operating position of 100% cold is approximately greater than 1, in the operating position of 50% cold and 50% warm is approximately 1:1, and in the operating position of 100% warm is approximately less than 1. This creates an adjustment characteristic in which the adjustment speed of the mixing flap is faster with predominantly cold air than with approximately balanced air and the adjustment speed of the mixing flap with balanced air is faster than with predominantly warm air.

It is particularly advantageous if the nonlinear gear ratio or gear train gear ratio is selected such that the gear ratio in the operating position of 100% cold is approximately X:1, in the operating position of 50% cold and 50% warm is approximately 1:1, and in the operating position of 100% warm is approximately 1:X, with X>1. This creates an adjustment characteristic in which the adjustment speed of the mixing flap is X-times faster with predominantly cold air than with approximately balanced air and the adjustment speed of the mixing flap with balanced air is X-times faster than with predominantly warm air.

Advantageously, the following applies to X:X is in the range from 1.5 to 5, preferably 1.5, 2, 2.5, 3, 4, or 5 or intermediate values thereof. This makes it possible to achieve reasonable linearizations of the adjustment characteristic.

In a further exemplary embodiment, it is advantageous if the cold air path leads from an evaporator to the mixing chamber and the warm air path leads from a heating element or heating heat exchanger to the mixing chamber.

In a further exemplary embodiment, it is expedient if a blower is provided in the housing for drawing in air through the air inlet and/or that at least one air outlet is provided for discharging cold air, warm air, or mixed air.

Further advantageous embodiments are described by the following description of the figures and by the dependent claims.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
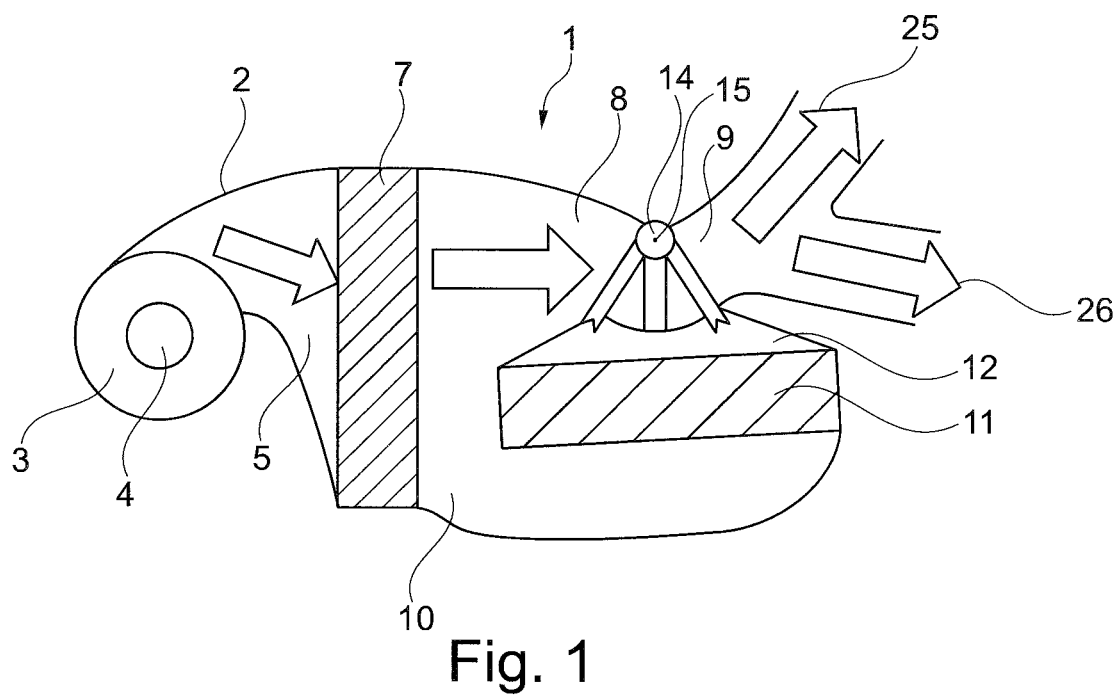
FIG. 1 shows a schematic representation of a HVAC system at an operating point at which substantially only cold air flows into the mixing chamber.

FIG. 1 shows a schematic representation of a HVAC system 1 for a motor vehicle, wherein the HVAC system has a housing 2. A blower 3 is provided in housing 2 for drawing in air through an air inlet 4. Air inlet 4 can be provided for admitting fresh air and/or circulating air. Depending on the design, a fresh air/circulating air flap can be provided for this purpose, which can be switched between fresh air or circulating air or a mixture thereof.

Furthermore, housing 2 has at least one air outlet or air exit 25 for discharging cold air, warm air, or mixed air. In the exemplary embodiment in FIG. 1, two air outlets or air exits 25, 26 are provided, through which temperature-controlled air can be discharged, for example, into a vehicle interior. More than two air outlets 25, 26 can also be provided, which can optionally also be controlled by at least one flap. Thus, for example, at least one footwell air outlet, at least one ventilation outlet, and/or at least one defrost outlet can be provided.

A first air path 5, which leads from blower 3 or from air inlet 4 to an evaporator 7, is provided in housing 2. Said evaporator 7 is optional and can also be omitted. Evaporator 7 cools the air flowing through it, so that cold air is present downstream of evaporator 7. The air flow downstream of evaporator 7 divides into a cold air path 8, which leads from evaporator 7 to a mixing chamber 9, and into a further air path 10, which leads to a heating element 11 or heating heat exchanger through which air flows. Downstream of heating element 11, a warm air path 12 is provided through which air flows which has been heated in heating element 11 and which discharges into mixing chamber 9. Thus, at least one cold air path 8 in which cold air flows is provided in housing 2, and a warm air path 12 in which warm air flows is provided further in housing 2. In this regard, the warm air is warmer than the cold air, which is cooled down, for example, by the evaporator. If no evaporator is to be provided, the cold air as fresh air and/or circulating air would still be cooler than the warm air.

According to FIG. 1, warm air path 12 and cold air path 8 open into a mixing chamber 9 into which the air from cold air path 8 and warm air path 12 discharges.

Further, a mixing flap 14 is provided for controlling the proportion of cold air flowing into mixing chamber 9 and the proportion of warm air flowing into mixing chamber 9. In this regard, mixing flap 14 is arranged rotatable about an axis 15 and driven by a flap actuator 16, see FIG. 2. Mixing flap 14 is designed as a drum-shaped flap with a wall which is arranged at a distance from axis 15 and is, for example, arc-shaped.

Flap actuator 16 has a drive shaft 17 which is rotated when driven.

A gear 18 with a nonlinear translation characteristic is provided between mixing flap 14 and drive shaft 17.

Gear 18 has a gear ratio that is variable via the angle of rotation of drive shaft 17 of flap actuator 16.

Figure 2:
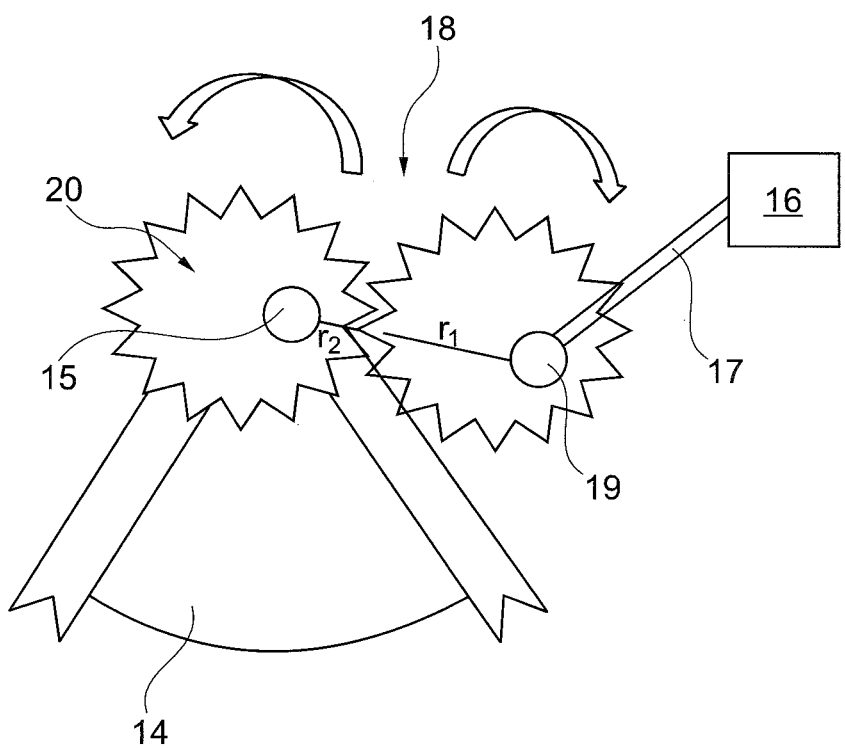
FIG. 2 shows a view of the mixing flap according to FIG. 1 with drive gears.

FIG. 2 shows that gear 18 is a gear train which has a gear train gear ratio that can be varied via the angle of rotation of drive shaft 17 of flap actuator 16. Alternatively, gear 18 can also be a belt drive or a friction gear, which has a gear ratio that is variable via the angle of rotation.

In the shown exemplary embodiment, the nonlinear gear ratio or gear train gear ratio is selected such that the rotation of mixing flap 14 from the operating position of 100% cold is faster than from the operating position of 50% cold and 50% warm and from the operating position of 100% warm at the same angle of rotation of drive shaft 17.

FIG. 1 shows a representation of HVAC system 1 in an operating position of 100% cold, so that only cold air flows into mixing chamber 9 and warm air path 12 is closed by mixing flap 14. It can be seen in FIG. 2 that gear wheel 19 on drive shaft 17 has a large radius r1 and gear wheel 20 on mixing flap 14 has a small radius r2. Thus, there is a speed-increasing gear ratio.

Figure 3:
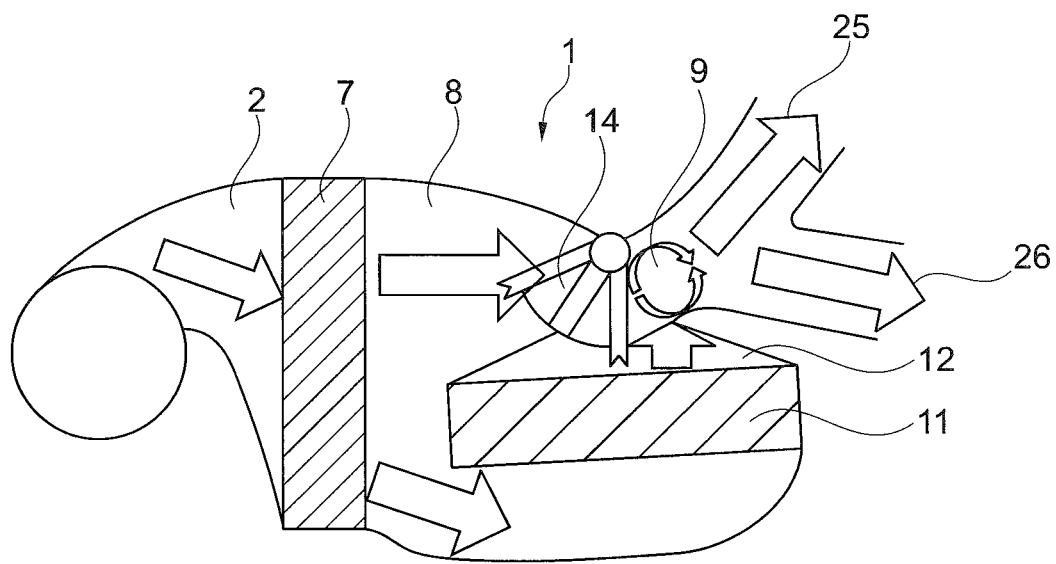
FIG. 3 shows a schematic representation of a HVAC system at an operating point at which substantially approximately half cold air and warm air flow into the mixing chamber.
Figure 4:
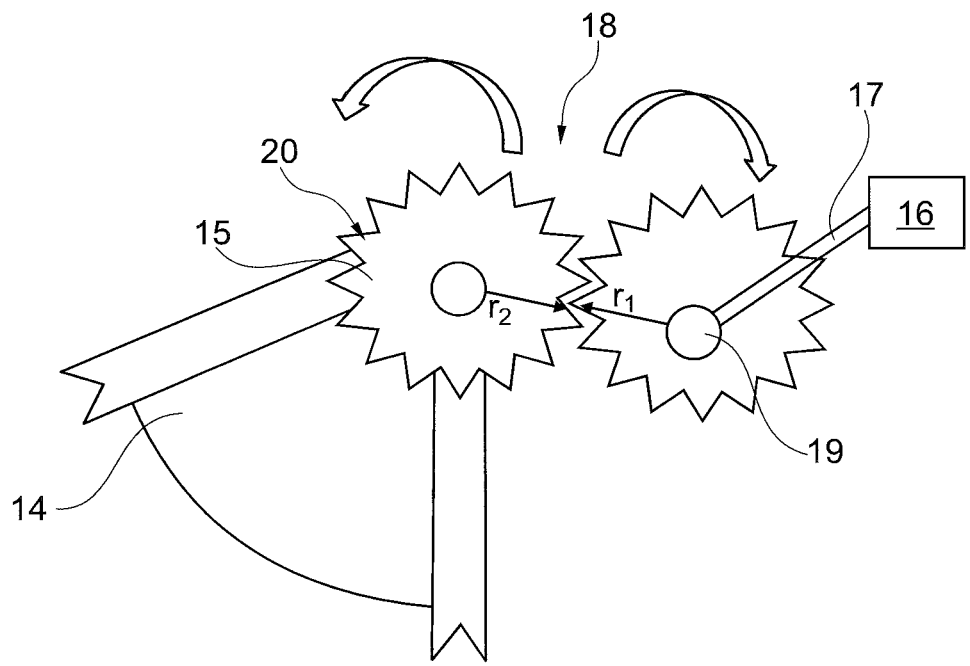
FIG. 4 shows a view of the mixing flap according to FIG. 3 with drive gears.

FIG. 3 shows a representation of HVAC system 1 in an operating position of 50% cold and 50% warm, so that cold air and warm air flow in approximately equal proportions into mixing chamber 9, wherein cold air path 8 and warm air path 12 are proportionally opened by mixing flap 14. It can be seen in FIG. 4 that gear wheel 19 on drive shaft 17 has an approximately equally large radius r1 as gear wheel 20 on mixing flap 14 with its radius r2. Thus, there is neither a speed-increasing nor a speed-reducing gear ratio.

Figure 5:
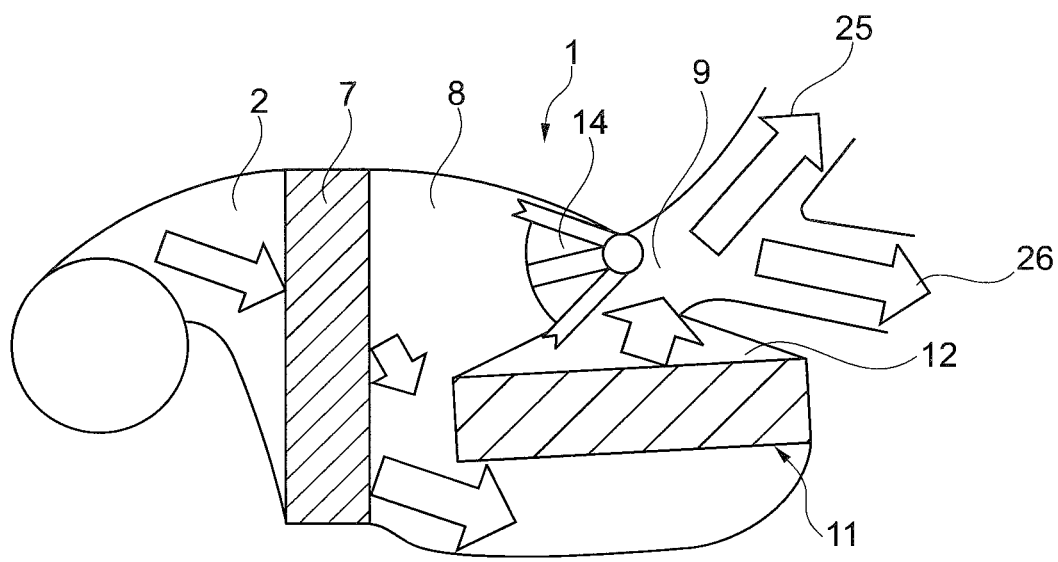
FIG. 5 shows a schematic representation of a HVAC system at an operating point at which substantially only warm air flows into the mixing chamber.
Figure 6:
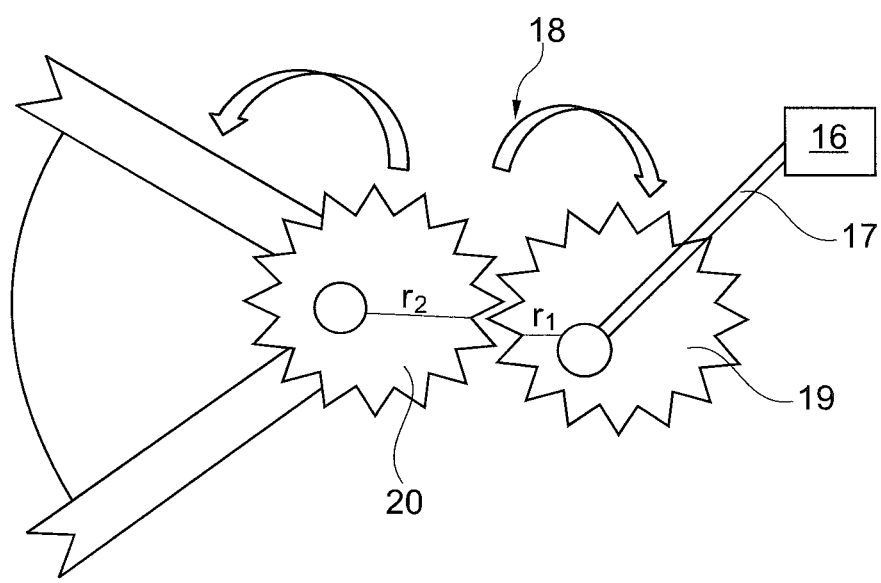
FIG. 6 shows a view of the mixing flap according to FIG. 5 with drive gears.

FIG. 5 shows a representation of HVAC system 1 in an operating position of 100% warm, so that only warm air flows into mixing chamber 9 and cold air path 8 is closed by mixing flap 14. It can be seen in FIG. 6 that gear wheel 19 on drive shaft 17 has a small radius r1 and gear wheel 20 on mixing flap 14 has a large radius r2. Thus, there is a speed-reducing gear reduction.

The nonlinear gear ratio or gear train gear ratio is therefore selected such that the rotation of mixing flap 14 from the operating position of 50% cold and 50% warm is faster than from the operating position of 100% warm at the same angle of rotation of the drive shaft.

The nonlinear gear ratio or gear train gear ratio is also selected such that the gear ratio in the operating position of 100% cold is approximately greater than 1, in the operating position of 50% cold and 50% warm is approximately 1:1, and in the operating position of 100% warm is approximately less than 1. It can also be stated that the nonlinear gear ratio or gear train gear ratio is selected such that the gear ratio in the operating position of 100% cold is approximately X:1, in the operating position of 50% cold and 50% warm is approximately 1:1, and in the operating position of 100% warm is approximately 1:X, with X>1, wherein the following applies in particular to X:X is in the range from 1.5 to 5, preferably 1.5, 2, 2.5, 3, 4, or 5 or intermediate values thereof.

Figure 7:
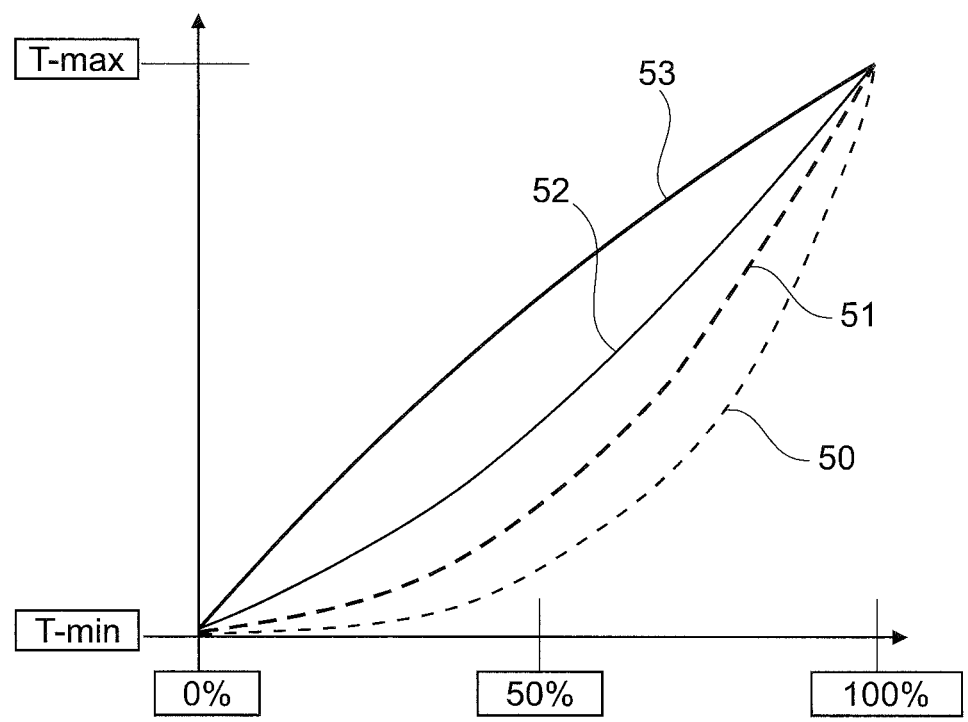
FIG. 7 shows a diagram to illustrate the control curves.

FIG. 7 shows a diagram in which control curves are shown which represent a temperature as a function of the angle of rotation of the drive. In this regard, the angle of rotation from 0%, therefore, the cold position, to 100%, therefore, the warm position, is plotted. In this regard, curves 50 and 51 show curves of the temperature at air outlet 25 and at air outlet 26 with a direct 1:1 gear ratio between drive shaft 17 and mixing flap 14. It can be seen that curves 50 and 51 sag greatly toward colder temperatures.

Curves 52 and 53 further show curves of the temperature at air outlet 25 and at air outlet 26 with a nonlinear gear ratio between drive shaft 17 and mixing flap 14. It can be seen that curves 52 and 53 are rather linear and sag less greatly.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A HVAC system for a motor vehicle, the system comprising:
   a housing having an air inlet for admitting air and a cold air path in which cold air flows is provided in the housing and a warm air path in which warm air flows is provided in the housing, wherein the warm air path and the cold air path open into a mixing chamber;
   a mixing flap for controlling the proportion of cold air flowing into the mixing chamber and the proportion of warm air flowing into the mixing chamber, wherein the mixing flap is arranged rotatable about an axis and is driven by a flap actuator that has a drive shaft;
   a gear assembly with a nonlinear translation characteristic arranged between the mixing flap and the drive shaft, wherein the gear assembly is a gear train, which has a gear train gear ratio that is variable via an angle of rotation of the drive shaft of the flap actuator or the gear assembly includes a belt drive or a friction gear, which has a gear ratio that is variable via the angle of rotation, wherein the nonlinear gear ratio or gear train gear ratio is selected such that the rotation of the mixing flap from an operating position of 100% cold is faster than from an operating position of 50% cold and 50% warm and from an operating position of 100% warm at the same angle of rotation of the drive shaft, and
   wherein the nonlinear gear ratio or gear train gear ratio is selected such that the gear ratio in the operating position of 100% cold is greater than 1, in the operating position of 50% cold and 50% warm is 1:1, and in the operating position of 100% warm is less than 1.

2. The HVAC system according to claim 1, wherein the nonlinear gear ratio or gear train gear ratio is selected such that the rotation of the mixing flap from the operating position of 50% cold and 50% warm is faster than from the operating position of 100% warm at the same angle of rotation of the drive shaft.

3. The HVAC system according to claim 1, wherein the cold air path leads from an evaporator to the mixing chamber and the warm air path leads from a heating element or heating heat exchanger to the mixing chamber.

4. The HVAC system according to claim 1, wherein a blower is provided in the housing for drawing in air through the air inlet and wherein at least one air outlet is provided for discharging cold air, warm air, or mixed air.

5. A HVAC system for a motor vehicle, the system comprising:
   a housing having an air inlet for admitting air and a cold air path in which cold air flows is provided in the housing and a warm air path in which warm air flows is provided in the housing, wherein the warm air path and the cold air path open into a mixing chamber;
   a mixing flap for controlling the proportion of cold air flowing into the mixing chamber and the proportion of warm air flowing into the mixing chamber, wherein the mixing flap is arranged rotatable about an axis and is driven by a flap actuator that has a drive shaft;
   a gear assembly with a nonlinear translation characteristic arranged between the mixing flap and the drive shaft, wherein the gear assembly is a gear train, which has a gear train gear ratio that is variable via an angle of rotation of the drive shaft of the flap actuator or the gear assembly includes a belt drive or a friction gear, which has a gear ratio that is variable via the angle of rotation, wherein the nonlinear gear ratio or gear train gear ratio is selected such that the rotation of the mixing flap from an operating position of 100% cold is faster than from an operating position of 50% cold and 50% warm and from an operating position of 100% warm at the same angle of rotation of the drive shaft, and wherein the nonlinear gear ratio or gear train gear ratio is selected such that the gear ratio in the operating position of 100% cold is X:1, in the operating position of 50% cold and 50% warm is 1:1, and in the operating position of 100% warm is 1:X, with X>1.

6. The HVAC system according to claim 5, wherein the following applies to X:

X is in the range from 1.5 to 5.

7. The HVAC system according to claim 6, wherein X is 1.5, 2, 2.5, 3, 4, 5 or intermediate values thereof.

* * * * *